(12) United States Patent
Miller et al.

(10) Patent No.: US 9,676,042 B2
(45) Date of Patent: Jun. 13, 2017

(54) REMOTE CUTTER HEAD AND SYSTEM

(71) Applicant: COUPLING CORPORATION OF AMERICA, INC., Jacobus, PA (US)

(72) Inventors: Troy Miller, Spring Grove, PA (US); Thomas Yingling, Codorus, PA (US); Joe Hoffman, Dover, PA (US); Dale McPherson, York, PA (US)

(73) Assignee: Coupling Corporation of America, Inc., Jacobus, PA (US)

( * ) Notice: Subject to any disclaimer, the term of this patent is extended or adjusted under 35 U.S.C. 154(b) by 267 days.

(21) Appl. No.: 14/182,328

(22) Filed: Feb. 18, 2014

(65) Prior Publication Data

US 2014/0230623 A1 Aug. 21, 2014

Related U.S. Application Data

(60) Provisional application No. 61/767,525, filed on Feb. 21, 2013.

(51) Int. Cl.
*F16L 55/18* (2006.01)
*B23C 5/02* (2006.01)
*B23C 3/12* (2006.01)

(52) U.S. Cl.
CPC ............... *B23C 5/02* (2013.01); *B23C 3/124* (2013.01); *Y10T 83/828* (2015.04); *Y10T 83/8789* (2015.04); *Y10T 83/9396* (2015.04)

(58) Field of Classification Search
CPC . F16L 55/18; B23C 3/124; B23C 5/02; Y10T 83/9396; Y10T 83/8789; Y10T 83/828
See application file for complete search history.

(56) References Cited

U.S. PATENT DOCUMENTS 4,222,687 A * 9/1980 Williams ................. 408/79
4,819,721 A 4/1989 Long, Jr.
(Continued)

FOREIGN PATENT DOCUMENTS

DE 19745497 A1 4/1999
DE 10118217 A1 10/2002
(Continued)

OTHER PUBLICATIONS

Dancutter, DC Mini-Bike, http://dancutter.dk/eng/eng-menu/cutters/dc-minibike/, Apr. 19, 2011.
Dancutter, DC Flex, http://dancutter.dk/eng/eng-menu/cutters/dc-flex/, Feb. 15, 2012.
(Continued)

*Primary Examiner* — Tara M. Pinnock
(74) *Attorney, Agent, or Firm* — McNees Wallace & Nurick LLC

(57) ABSTRACT

A remote cutter head and a system therefore which can operate in confined spaces are provided. The remote cutting system including a cutter assembly driven by a fluid source, a pushrod hose coupling the cutter assembly to the fluid source, a control assembly detachably secured to the pushrod hose, and a monitor assembly coupled to at least one camera. The monitor assembly provides video images of the cutter assembly and cutter assembly surroundings. The cutting head including a fluid-driven gearmotor, the gearmotor including a two-piece housing, bearings, a pressure balanced gearmotor cavity, and two rotating members provided in the pressure balanced gearmotor cavity, one of the rotating members protruding from the cutting head. High-pressure fluid provided to the cutting head turns the two rotating members to drive a cutting bit attached to the rotating member protruding from the cutting head. Also provided is a cutting bit.

13 Claims, 14 Drawing Sheets

(56) References Cited

U.S. PATENT DOCUMENTS

| | | | |
|---|---|---|---|
| 4,986,314 A | 1/1991 | Himmler | |
| 5,105,882 A | 4/1992 | Ralston et al. | |
| 5,197,540 A | 3/1993 | Yagi et al. | |
| 5,286,144 A | 2/1994 | Griner | |
| 5,368,423 A | 11/1994 | Hanna | |
| 5,378,092 A | 1/1995 | Griner | |
| 5,403,122 A * | 4/1995 | Granella | 405/184 |
| 5,899,796 A | 5/1999 | Kamiyama et al. | |
| 5,960,882 A | 10/1999 | Polivka | |
| 6,386,797 B1 | 5/2002 | Gearhart | |
| 7,249,918 B1 | 7/2007 | Bowman | |
| 7,364,392 B1 | 4/2008 | Bowman | |
| 7,473,057 B1 | 1/2009 | Bowman | |
| 7,806,638 B1 | 10/2010 | Bowman | |
| 2013/0293699 A1 | 11/2013 | Zipperlen | |

FOREIGN PATENT DOCUMENTS

| | | |
|---|---|---|
| DE | 202006002790 U1 | 4/2006 |
| DE | 202011002603 U1 | 4/2011 |
| JP | S61168412 A | 7/1986 |

OTHER PUBLICATIONS

Dancutter, DC 80, http://dancutter.dk/eng/eng-menu/cutters/dc-80/, Feb. 15, 2012.
Dancutter, DC Spider, http://dancutter.dk/eng/eng-menu/cutters/dc-spider/, Aug. 28, 2012.
Hächler Umwelttechnik, Climb, http://www.haechlerag.com/produkte/hausanschlussroboter/, Jun. 19, 2013.
IMS, IMS Micro, http://www.ims-robotics.de/en/produkte/robotergrundleitung.html, Mar. 15, 2013.
IST, Power Cutter 150, http://www.ist-web.com/de/roboter/power-cutter-micro.html, Aug. 30, 2010.
Prokasro, Kasro light DN100-200, http://prokasro.de/en/products/working-robots-pneumatic/kasro-light-self-propelled-unit-dn100-200, May 17, 2013.
Optum, Springbok Lateral Cutter, http://www.optumsupplies.com/product.php/2/springbok-lateral-cutter, Sep. 17, 2011.
Optum, Down the Branch Cutter, http://www.optumsupplies.com/product.php/21/down-the-branch-cutter, Sep. 7, 2011.
Maxliner USA, MaxCutter, http://www.maxlinerusa.com/index.php?option=com_content&view=article&id=61&Itemid=29, Feb. 1, 2002.
IMS, IMS Mini, http://www.ims-robotics.de/en/produkte/robotergrundleitung.html, Mar. 15, 2013.

* cited by examiner

REMOTE CUTTER HEAD AND SYSTEM

FIELD OF THE INVENTION

The present invention is directed to a remote cutter head and a system therefore. In particular, the invention is directed to a remote cutter head having a fluid-driven gearmotor to drive a cutting bit.

BACKGROUND OF THE INVENTION

One method of rehabilitating defective pipe is to insert a soft liner within the pipe, and through various means cause it to harden against the host pipe. Hardening the soft liner results in a new pipe inside the defective pipe, and saves the inconvenience of digging up the old pipe to replace it. This new liner, however, blocks the entrance of previously-adjoining pipes. To re-open the entrance of previously-adjoining pipes, a remote cutting device is used to maneuver through the newly lined pipe and cut the liner at the intersection points.

Placement of the cutting device in the pipe is done in various ways using different methods of control and propulsion. Some use fiberglass push-rods, others use methods of self-propulsion, while another places all electric cables and air hoses inside a push-rod hose and uses a hose-pushing/pulling mechanism to motivate the robot into place.

Previous devices for cutting pipe liner have mostly focused on the larger pipes found in larger-diameter sewer "mains." In these situations a cutting device does not need to navigate tight bends. However, smaller pipes, such as those inside buildings, or "laterals" joining buildings to a larger sewer "main" have been difficult to access with remote cutting devices.

Because of limited space, other cutting devices developed for the smaller-diameter "lateral" pipes include cutting bits that have a "mushroom" style as opposed to the more standard straight-flute designs. To cut effectively with a mushroom-style bit requires significant power. Most of the cutting devices having "mushroom" style cutting bits use low-power air-driven motors to perform the cutting action. The use of low-power air-driven motors requires increased cutting time and decreases cutting efficiency.

Additionally, in the previous devices, a standard way of holding the bit, such as via a collet or chuck, requires the shaft to be long, thereby limiting the ability of the device to perform in small diameter pipes. Alternatively, other prior art devices have cutting bits which thread directly onto a shaft and tighten with a pin spanner wrench on the bit and an open-end wrench on the shaft hex. This requires special tools to be available to change bits.

A cutting device must be able to maneuver tight bends in small-diameter pipe, and still be able to generate enough power to cut the liner in a timely manner once the location is reached. It would, therefore, be beneficial to provide a remote cutting device which can be placed into small diameter pipes and which can be operated through ninety degree bends and the like. It would also be beneficial to provide a cutter assembly which is powered by hydraulics, thereby allowing the cutting head to have sufficient power to perform in a small space.

SUMMARY OF THE INVENTION

An embodiment is directed to a remote cutting system including a cutter assembly driven by a fluid source, a pushrod hose coupling the cutter assembly to the fluid source, a control assembly detachably secured to the pushrod hose, and a monitor assembly coupled to at least one camera. The monitor assembly provides video images of the cutter assembly and cutter assembly surroundings.

An embodiment is directed to a remote cutting system comprising a cutter assembly which is hydraulically powered.

An embodiment is directed to a remote cutting system wherein the pushrod hose is provided to control the linear and rotary motion of the cutter assembly.

An embodiment is directed to a remote cutting system wherein the control assembly is provided on the pushrod hose to allow an operator to control the movement of the pushrod hose and the cutter assembly.

An embodiment is directed to a cutting head including a fluid-driven gearmotor, the gearmotor including a two-piece housing, bearings, a pressure balanced gearmotor cavity, and two rotating members provided in the pressure balanced gearmotor cavity, one of the rotating members protruding from the cutting head. High-pressure fluid provided to the cutting head turns the two rotating members to drive a cutting bit attached to the rotating member protruding from the cutting head. The pressure balanced gearmotor cavity is pressure balanced by porting any fluid that enters the gearmotor cavity to exit freely.

An embodiment is directed to a cutting head which can perform in confined spaces, such as, but not limited to, small diameter pipes.

An embodiment is directed to a cutting head which can move around corners of approximately ninety degrees or less.

An embodiment is directed to a cutting bit including a cutting surface including non-helical flutes that provide a smooth, rounded cutting profile, and a gripping portion on a bottom half of the cutting bit. The gripping portion includes a flat relief between each of the non-helical flutes extending there through, the flat relief being cut with straight sides to allow tightening and loosening of the cutting bit without contacting the non-helical flutes.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
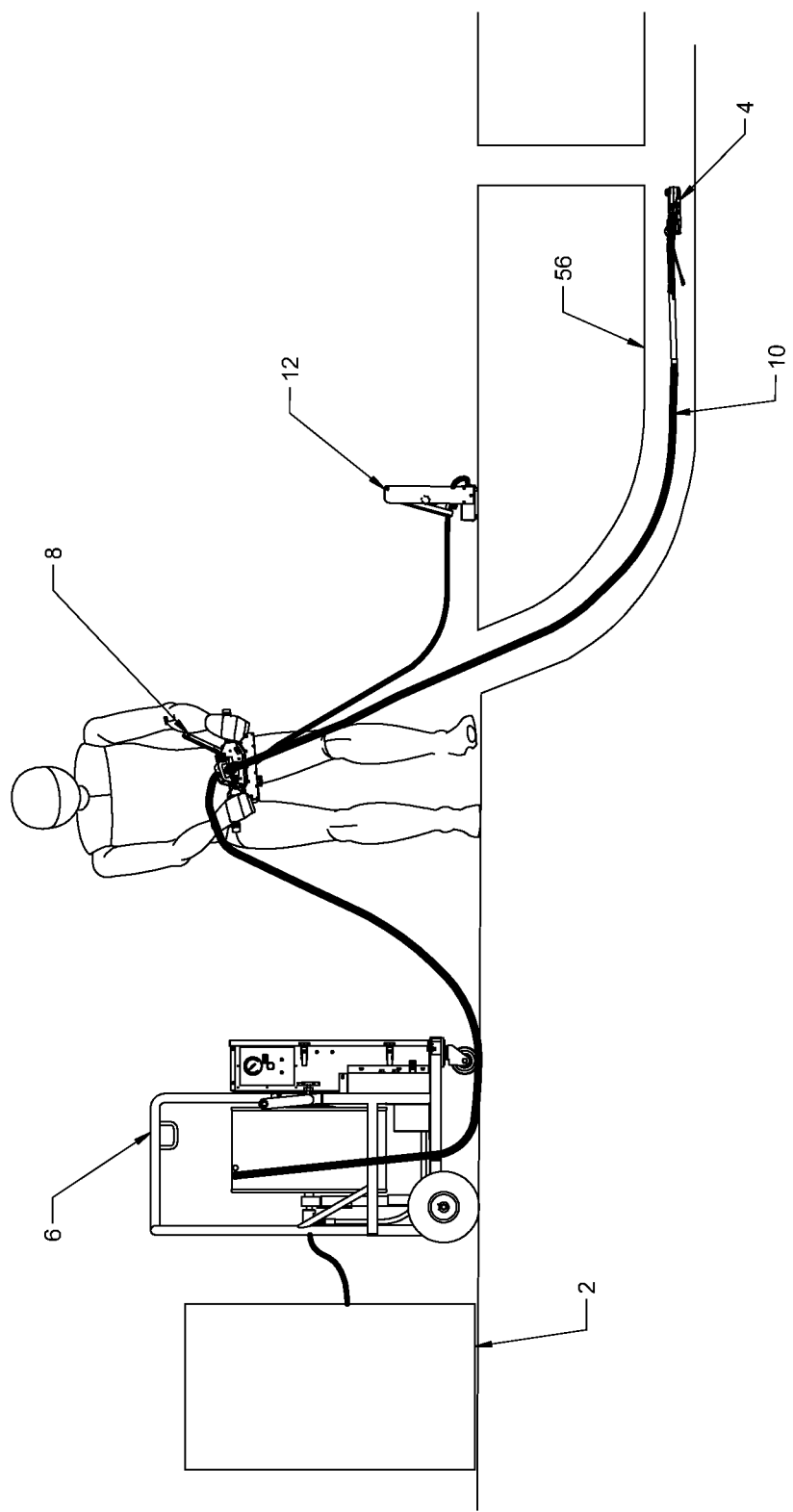
FIG. 1 is a diagrammatic view of an illustrative embodiment of the remote cutting device and system therefore, showing a cutter assembly and a portion of a pushrod hose inserted into a pipe.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

Provided are a remote cutting system, a cutting head, and a cutting bit. Embodiments of the present disclosure, in comparison to cutting systems, cutting heads, and cutting bits not using one or more of the features disclosed herein, permit maneuvering through tight bends in small-diameter pipe, permit navigation through small-diameter 90-degree bends, generate increased power, or a combination thereof.

Referring to FIG. 1, in one embodiment, a remote cutting system 1 includes a fluid source 2, a cart assembly 6, a control assembly 8, a pushrod hose 10, a monitor assembly 12, at least one camera 36, and a cutter assembly 4. The fluid source 2 provides a fluid to drive the cutter assembly 4, and the cart assembly 6 includes components for control and monitoring of the cutter assembly 4. An operator controls the cutter assembly 4 using the control assembly 8, which is detachably secured to the pushrod hose 10. Together the monitor assembly 12 and the at least one camera 36 display a cutting head 14 of the cutter assembly 4 and surroundings.

Figure 2:
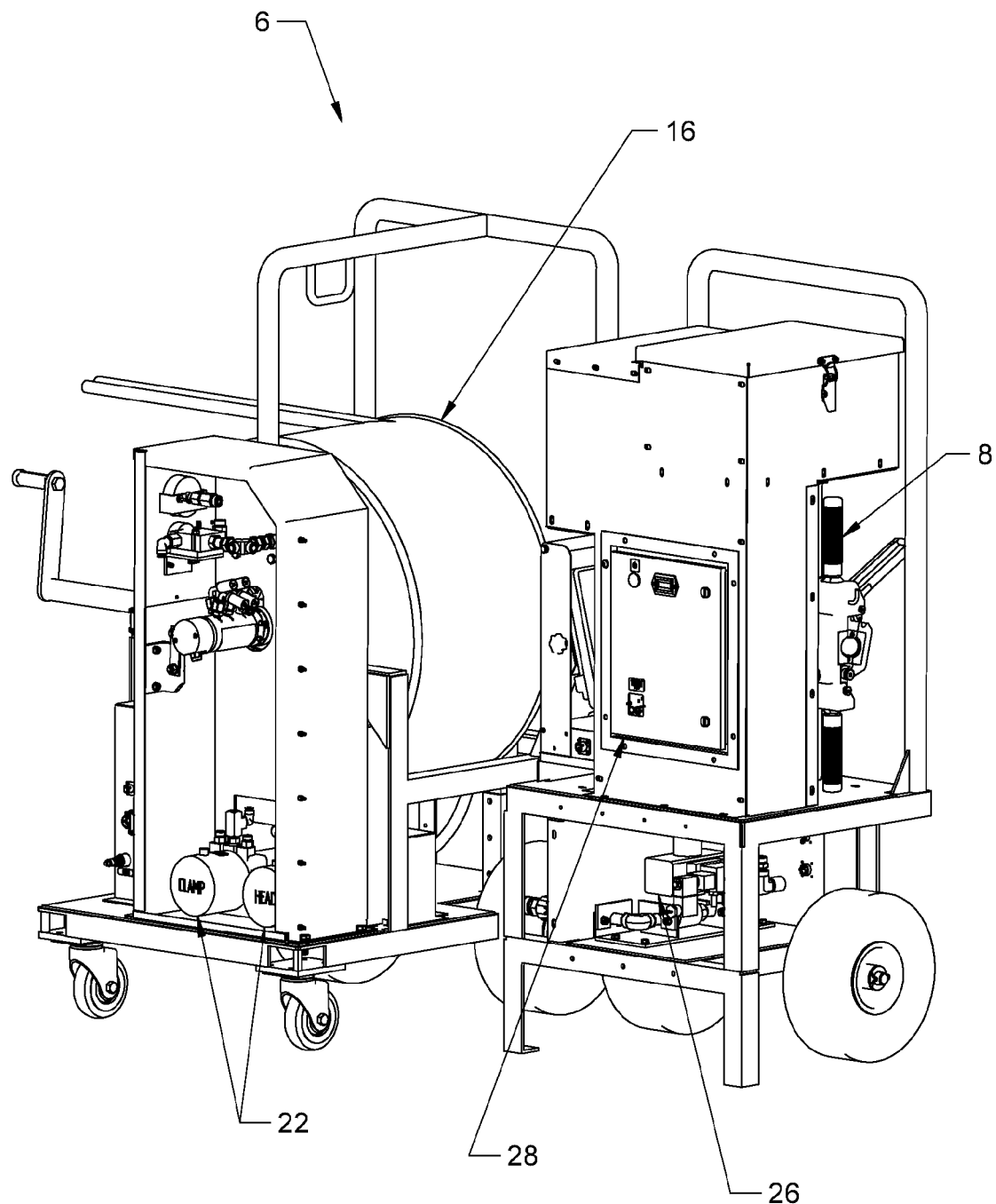
FIG. 2 is a front perspective view of a cart assembly used with the illustrative embodiment of FIG. 1.
Figure 3:
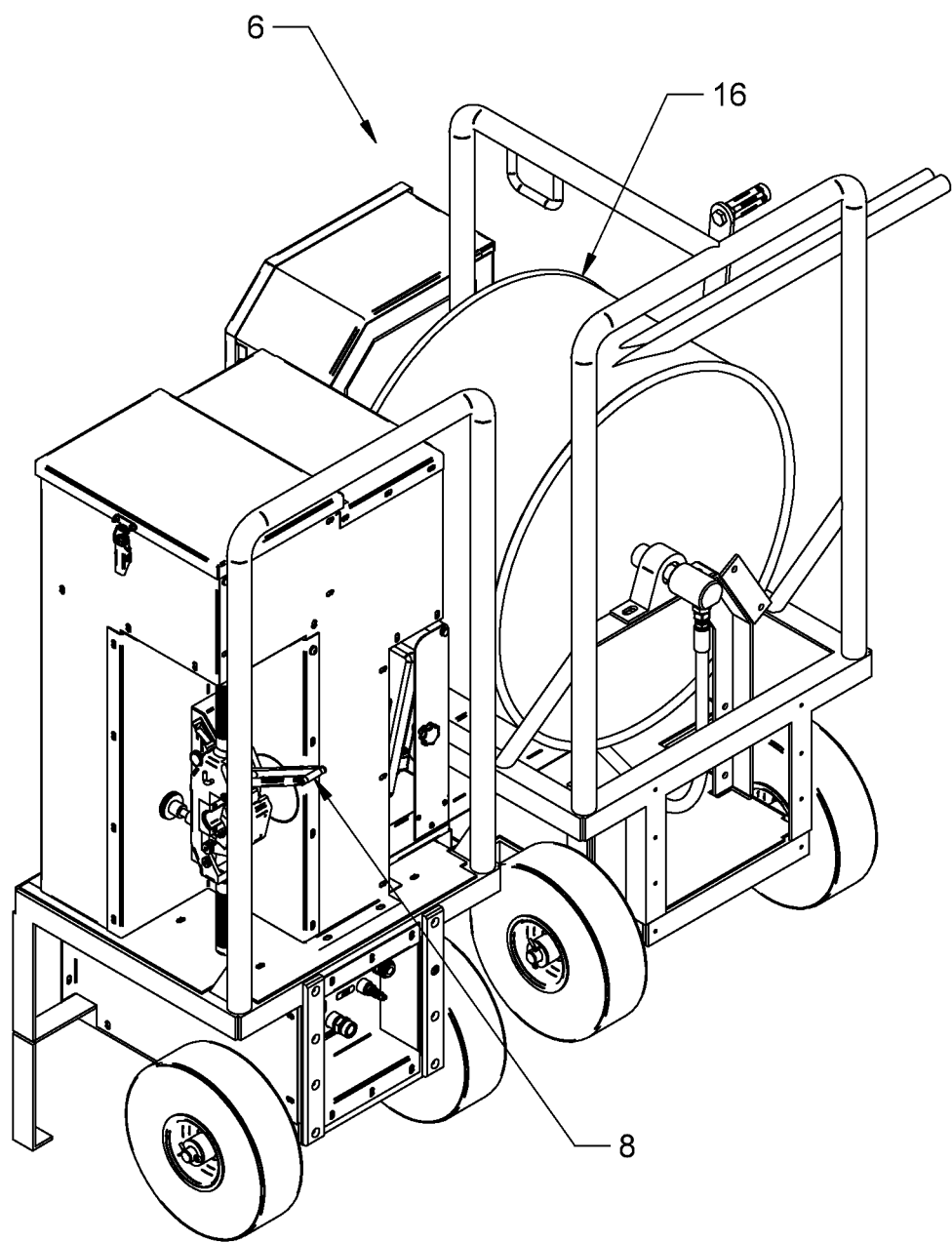
FIG. 3 is rear perspective view of a cart assembly according to an embodiment of the disclosure.
Figure 4:
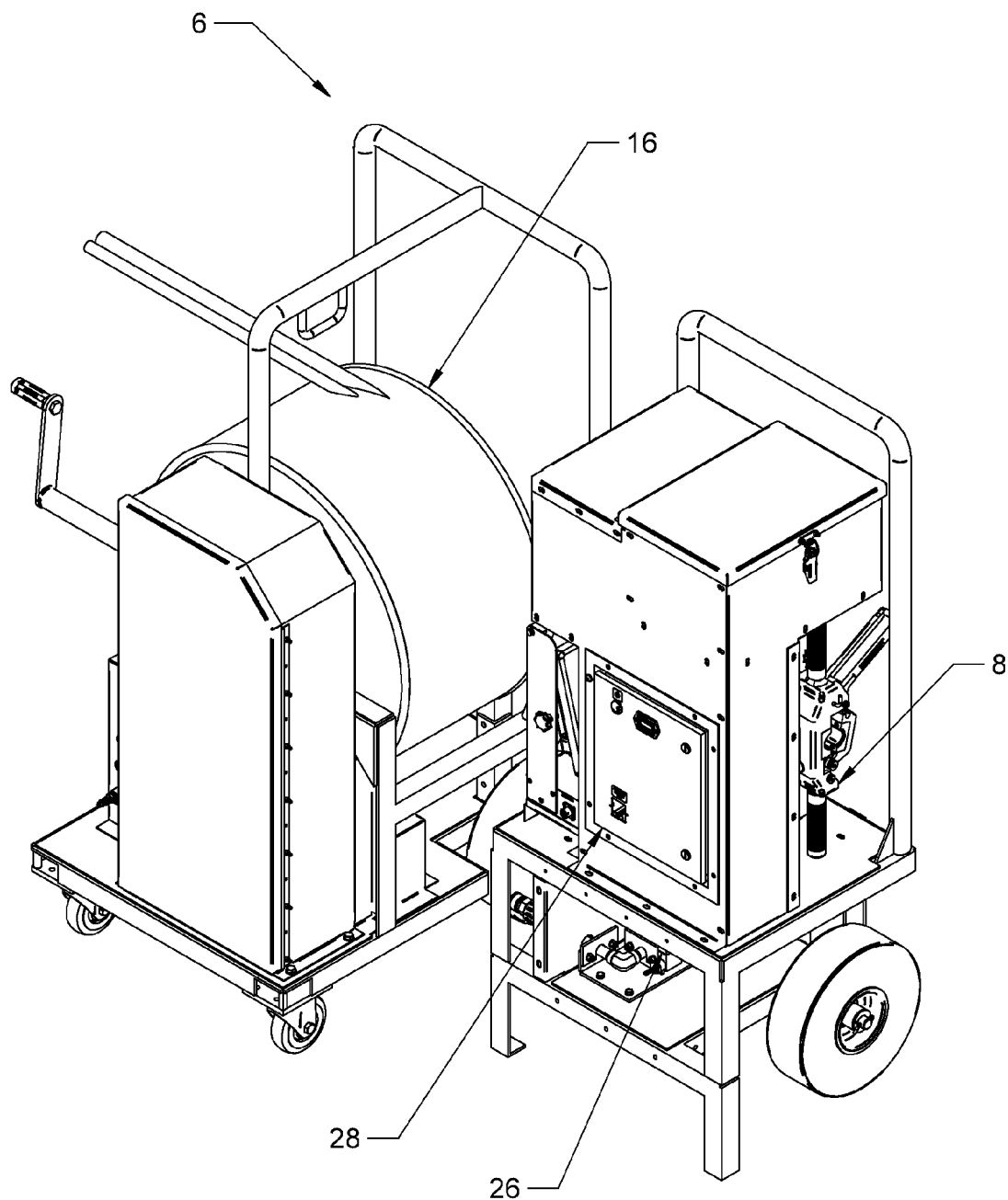
FIG. 4 is a perspective view of a cart assembly according to an embodiment of the disclosure.

Referring to FIGS. 2-4, in one embodiment, the cart assembly 6 includes at least one cart portion, a reel 16, two hydraulic power units 22, an automated fluid valve 26, and an electrical box 28. In another embodiment, the cart assembly 6 includes a first cart portion supporting the reel 16 and the two hydraulic power units 22, and a second cart portion supporting the automated fluid valve 26 and the electrical box 28. In a further embodiment, the second cart portion also detachably supports the control assembly 8. The first cart portion and the second cart portion may be separate, detachable, or integral with each other. In an alternate embodiment, for a larger pipe, the hydraulic power units 22 are located in a pod behind an actuator 54 (FIGS. 10-12) on the cutter assembly 4. The reel 16 holds the pushrod hose 10, four hydraulic hoses 18 (FIGS. 10-11), and a camera cable 20 (FIGS. 11-12). The four hydraulic hoses 18 connect the two hydraulic power units 22 to the actuator 54. The automated fluid valve 26 controls the fluid flow from the fluid source 2 to the cutter assembly 4.

Figure 5:
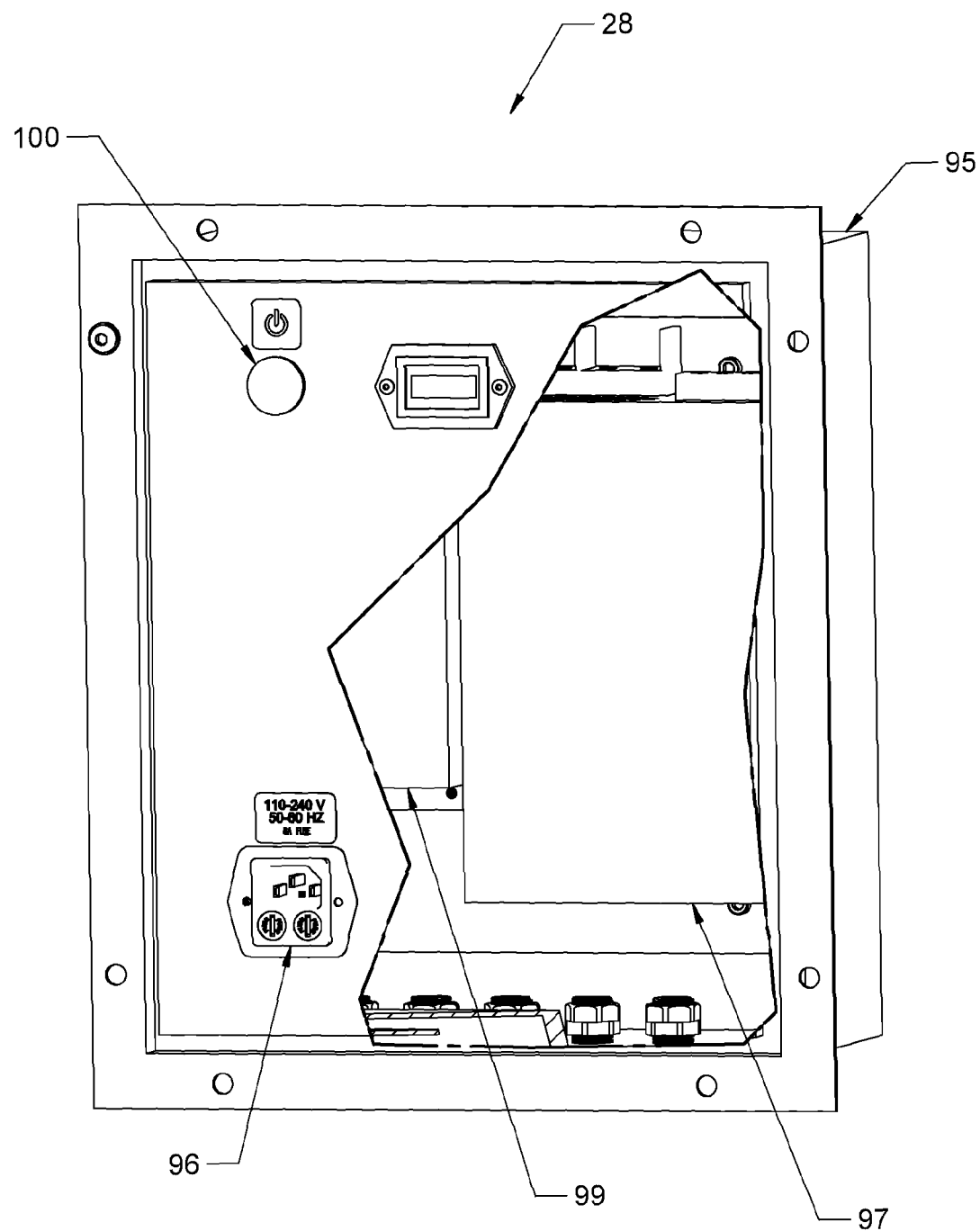
FIG. 5 is a cut-away view of an illustrative electrical box of the cart assembly according to an embodiment of the disclosure.

Referring to FIG. 5, the electrical box 28 is the hub for the electronic system, communicating with switches 30, 32, 48 on the control assembly 8, and the components these switches control. The electrical box 28 includes a power supply 97 and a circuit board 99 positioned within a control enclosure 95. In one embodiment, the switches 30, 32 control the hydraulic power units 22 and the automated fluid valve 26. In another embodiment, the electrical box 28 connects the monitor assembly 12 and camera controls 34 to the at least one camera 36 through the camera cable 20. A power cord with ground-fault interruption provides power to the cart assembly 6 through an AC inlet 96 and a power switch 100.

Figure 6:
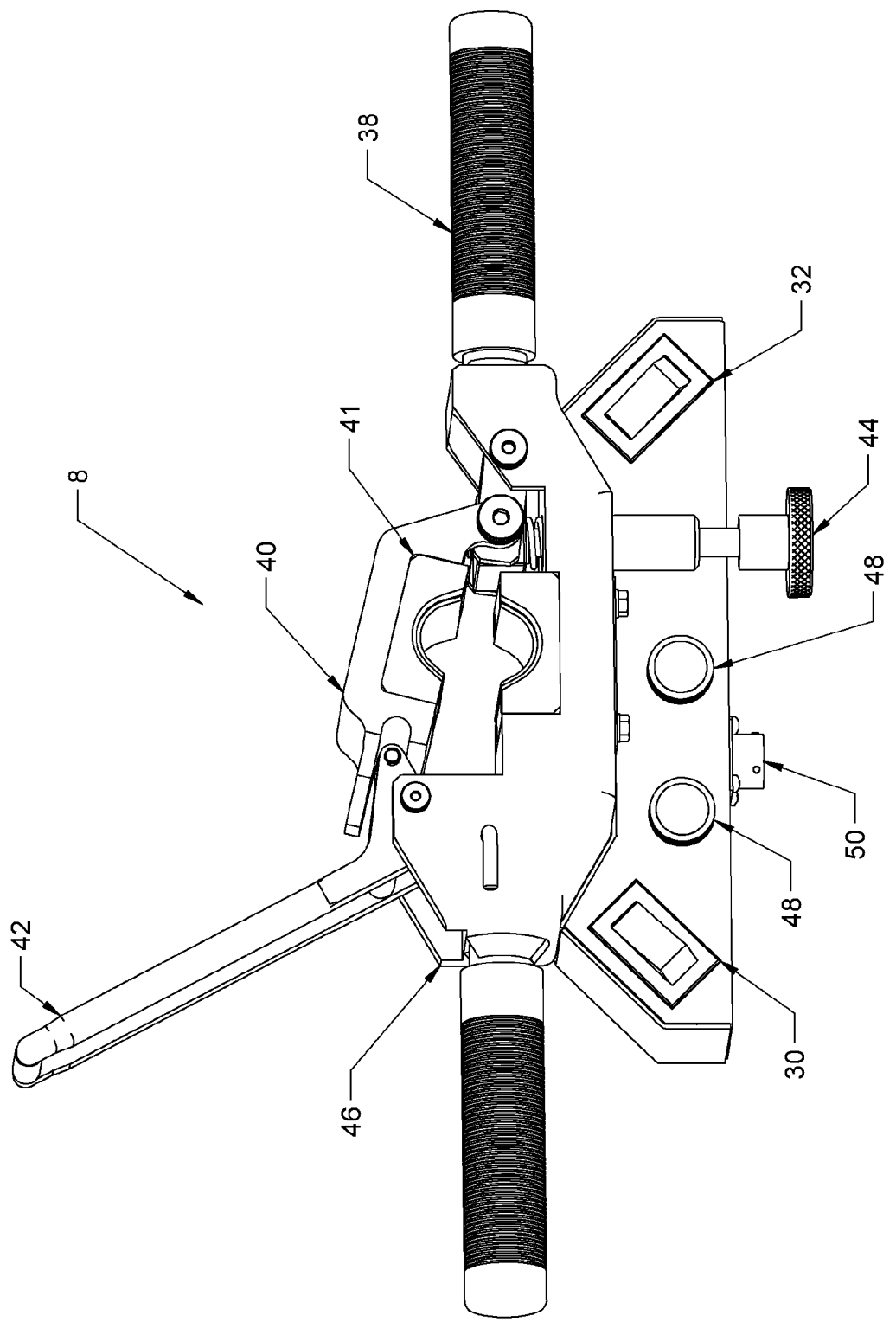
FIG. 6 is a perspective view of a handlebar assembly used with the illustrative embodiment of FIG. 1.

Referring to FIGS. 1 and 6, in one embodiment, the control assembly 8 is a handlebar assembly. The control assembly 8 is used to move the cutter assembly 4 through a pipe 56, and control the position of the cutter assembly 4 during cutting. An electrical cable exits from port 50 and joins to the cart assembly 6, thereby providing power to the control assembly 8. During operation, the operator holds onto handles 38 and the pushrod hose 10 feeds through a clamp 40, which may be lined with high-friction material. When a clamp lever 42 is pushed down the clamp 40 holds firm around the pushrod hose 10. An adjustment knob 44 controls a tightness with which the clamp 40 grips the pushrod hose 10 by pivoting a top clamp 41 to a lower position. When the clamp lever 42 is raised the pushrod hose 10 is held loosely in the clamp 40. This allows the operator to rest the control assembly 8 on the push-rod hose 10 without it falling. In one embodiment, when the clamp lever 42 is raised the pushrod hose 10 moves freely. In another embodiment, when the push-rod hose 10 moves freely, pushing the control assembly 8 slides the control assembly 8 along the pushrod hose 10. When a release latch 46 is compressed, the clamp lever 42 is able to fully release the clamp 40 permitting removal of the control assembly 8 from the pushrod hose 10.

The pushrod hose 10 couples the cutter assembly 4 to the fluid source 2, and provides the fluid from the fluid source 2 to the cutter assembly 4. Additionally, the pushrod hose 10 is torsionally rigid enough to control rotary movements of the cutter assembly 4, and stiff enough to control the linear movements of the cutter assembly 4 in the pipe 56. In one embodiment, a heavy-duty spiral wrap 60 (FIG. 8) stiffens the pushrod hose 10 and lowers its friction to enable the cutter assembly 4 to be pushed long distances.

Figure 7:
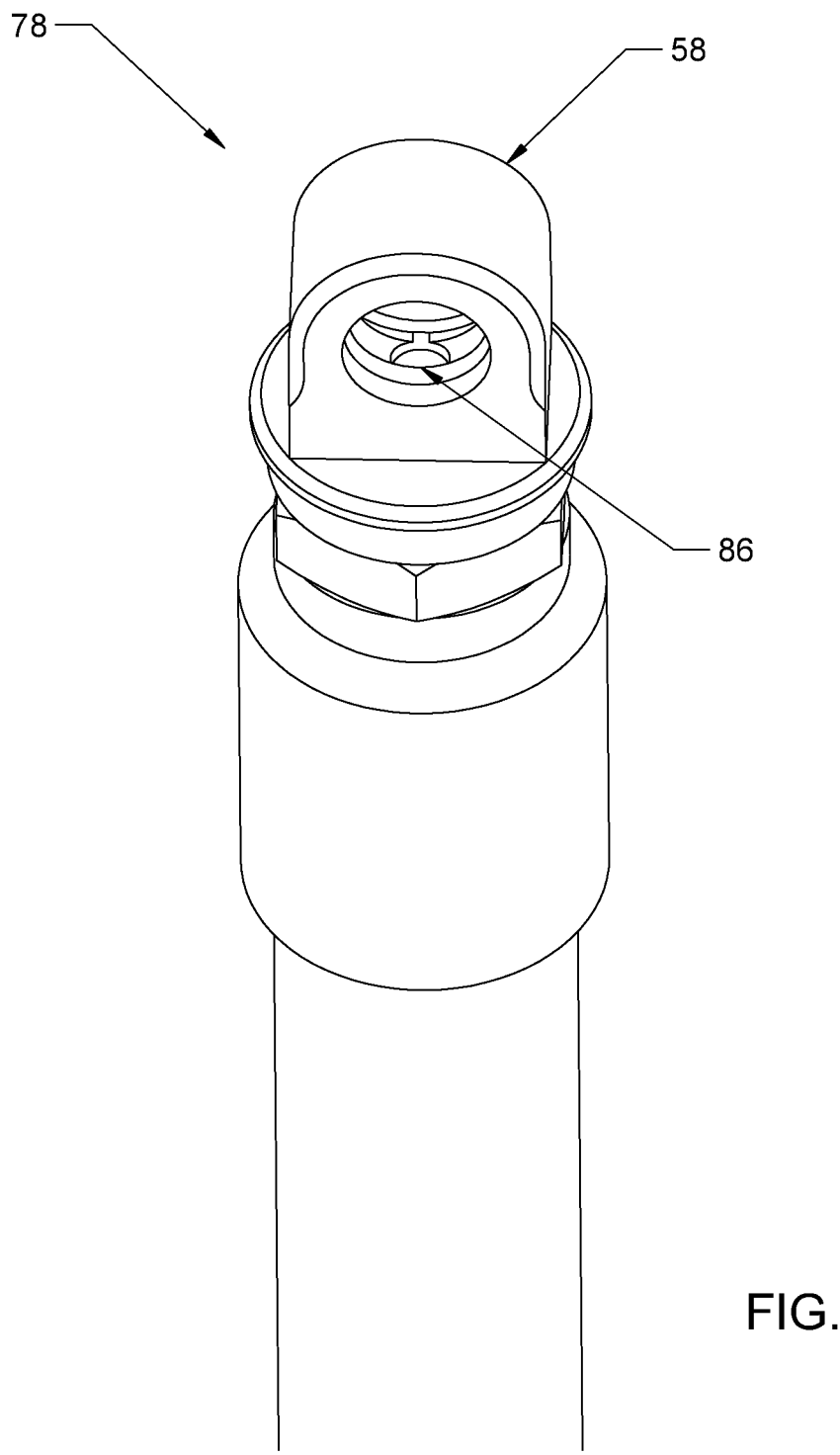
FIG. 7 is an enlarged perspective view of a connection device used to connect a pushrod hose to the cutter assembly.
Figure 8:
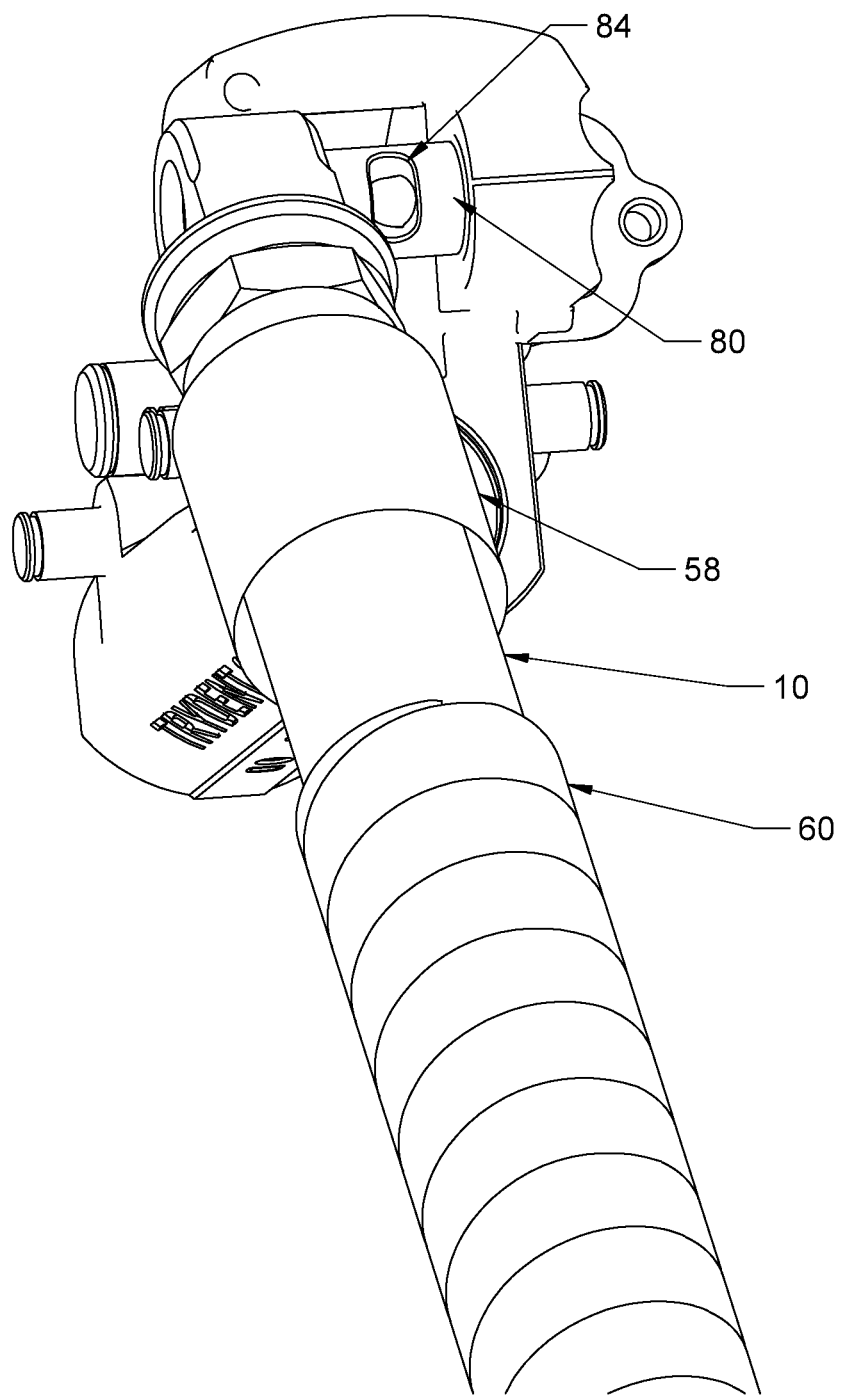
FIG. 8 is a perspective view of the connection device of FIG. 7 partially inserted onto a connecting pipe of the cutter assembly.
Figure 9:
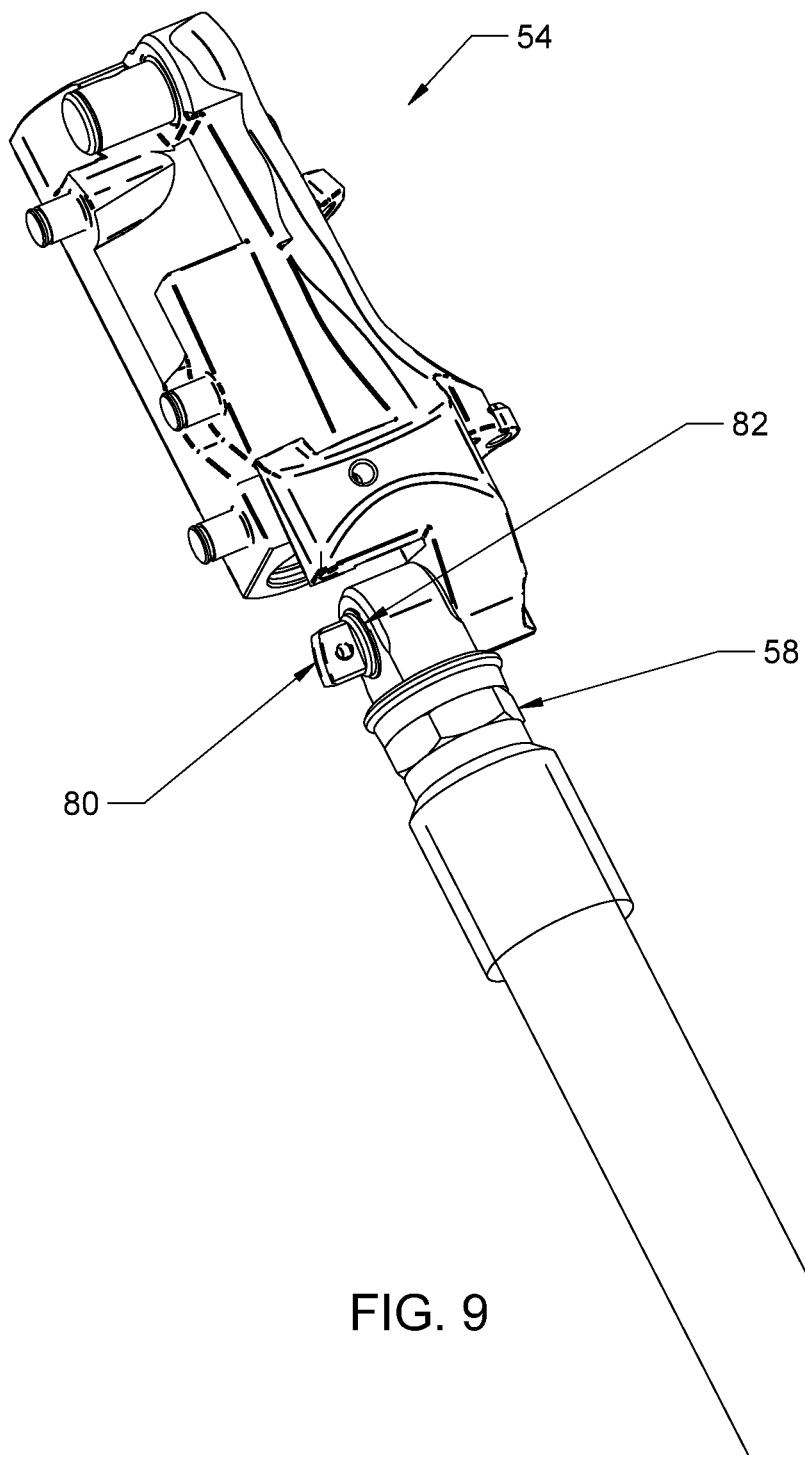
FIG. 9 is a perspective view of the connection device of FIG. 7 fully inserted onto the connecting pipe of the cutter assembly.

Referring to FIGS. 7-9, a fitting 58 is provided at the end of the pushrod hose 10 to connect the pushrod hose 10 to the cutter assembly 4. The fitting 58 is a combination of a "banjo" fitting and a rotary union. The fluid from the pushrod hose 10 is ported into the center of a ring 78 (FIG. 7) of the fitting 58. A partially-hollow post 80 (FIG. 8) protruding from the actuator 54 fits through the center of the ring 78 and is held in place by a retaining ring (not shown) which is secured in a slot 82. The post 80 has a port 84 in its side which matches or is aligned with an inlet 86 of the fitting 58. An inside diameter of the ring 78 has seals placed on either side of the porting location to restrict the fluid, causing the fluid to enter the semi-hollow post 80 through the port 84. The pushrod hose 10 translates bi-directional torque applied by the control assembly 8 to the cutter assembly 4 while allowing full fluid flow. The fitting 58 translates the torque from the pushrod hose 10 to the cutter assembly 4 while allowing the pushrod hose 10 to pivot in one axis.

Figure 10:
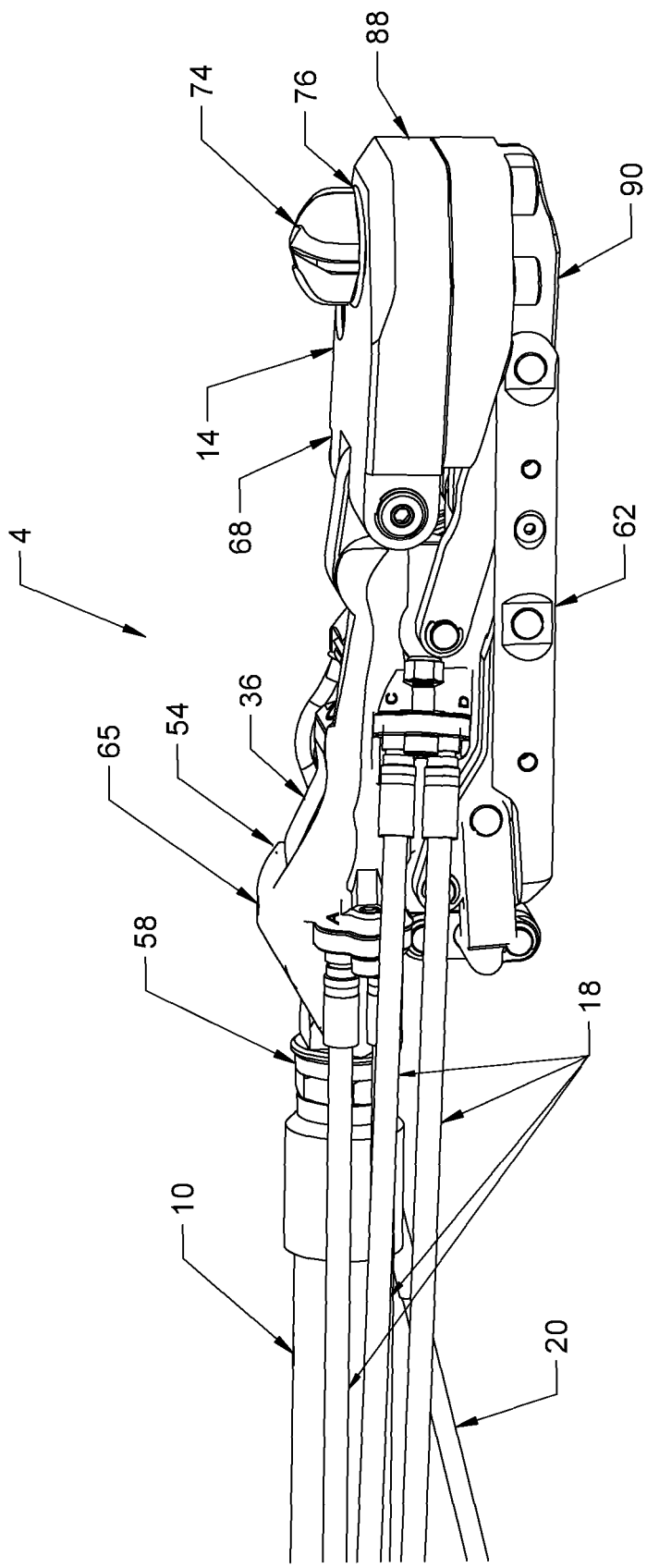
FIG. 10 is a perspective view of a cutter assembly used with the illustrative embodiment of FIG. 1.
Figure 11:
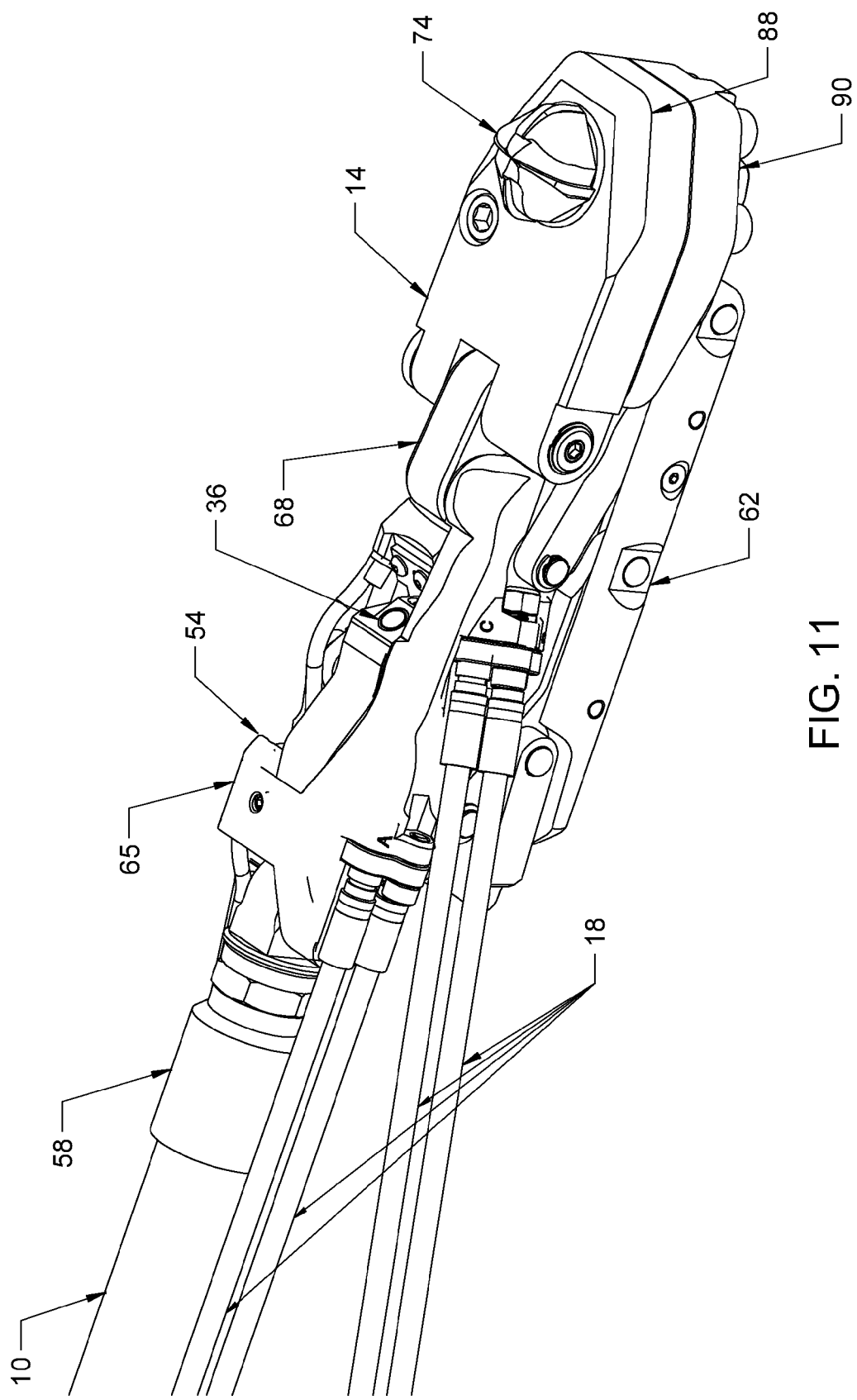
FIG. 11 is a top perspective view of a cutter assembly used with the illustrative embodiment of FIG. 1.
Figure 12:
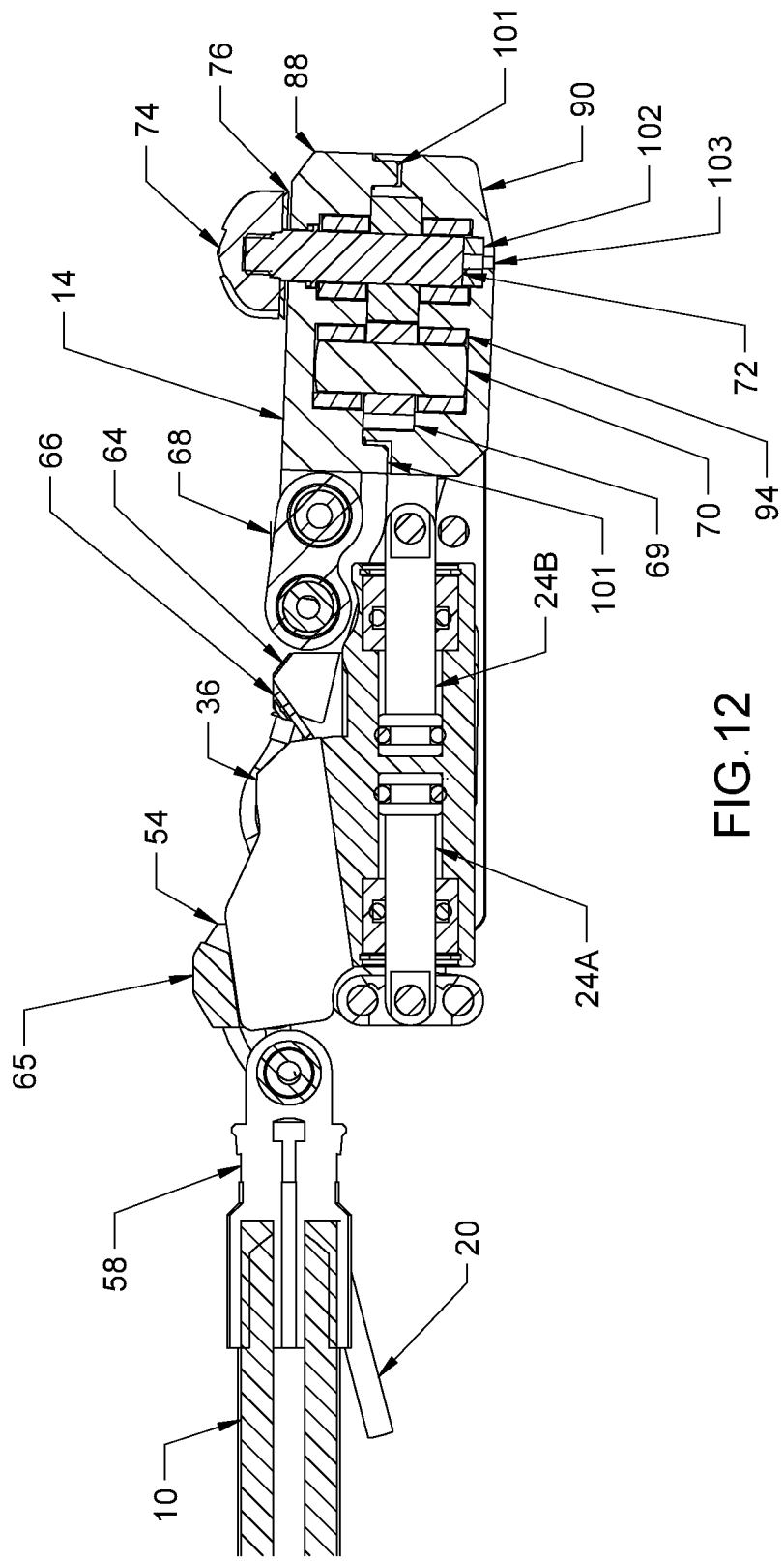
FIG. 12 is a cross-sectional view of the cutter assembly of FIG. 1.

Referring to FIGS. 10-12, the cutter assembly 4 includes the cutting head 14, the actuator 54, and the at least one camera 36. After entering the actuator 54 from the push-rod hose 10, the fluid is ported through an internal passageway to a linking arm 68 which has two ends similar to the pushrod fitting 58 to transmit rotational torque while allowing one axis of pivoting. Additionally the linking arm 68 has hollowed pathways provided therein to provide a channel for the fluid to flow to the cutting head 14 from the pushrod hose 10. The fluid then continues through an upper section of cutting head 14 to reach a gearmotor cavity 69.

The fluid provided by the fluid source 2 drives the cutting head 14. In one embodiment, the fluid source 2 is a pressure washer, and the fluid is high-pressure water from the pressure washer. In an alternate embodiment, the fluid is oil provided by an oil source. In another alternate embodiment, the fluid is air provided by an air source, such as a compressed air source. When the cutting bit 74 is driven by the high-pressure water, the remote cutting system 1 provides increased cutting power as compared to an air-driven motor. Additionally, the cutting head 14 driven by the high-pressure water is able to maneuver through pipes having decreased diameters as compared to an equivalent cutter powered with an electric motor.

Figure 13:
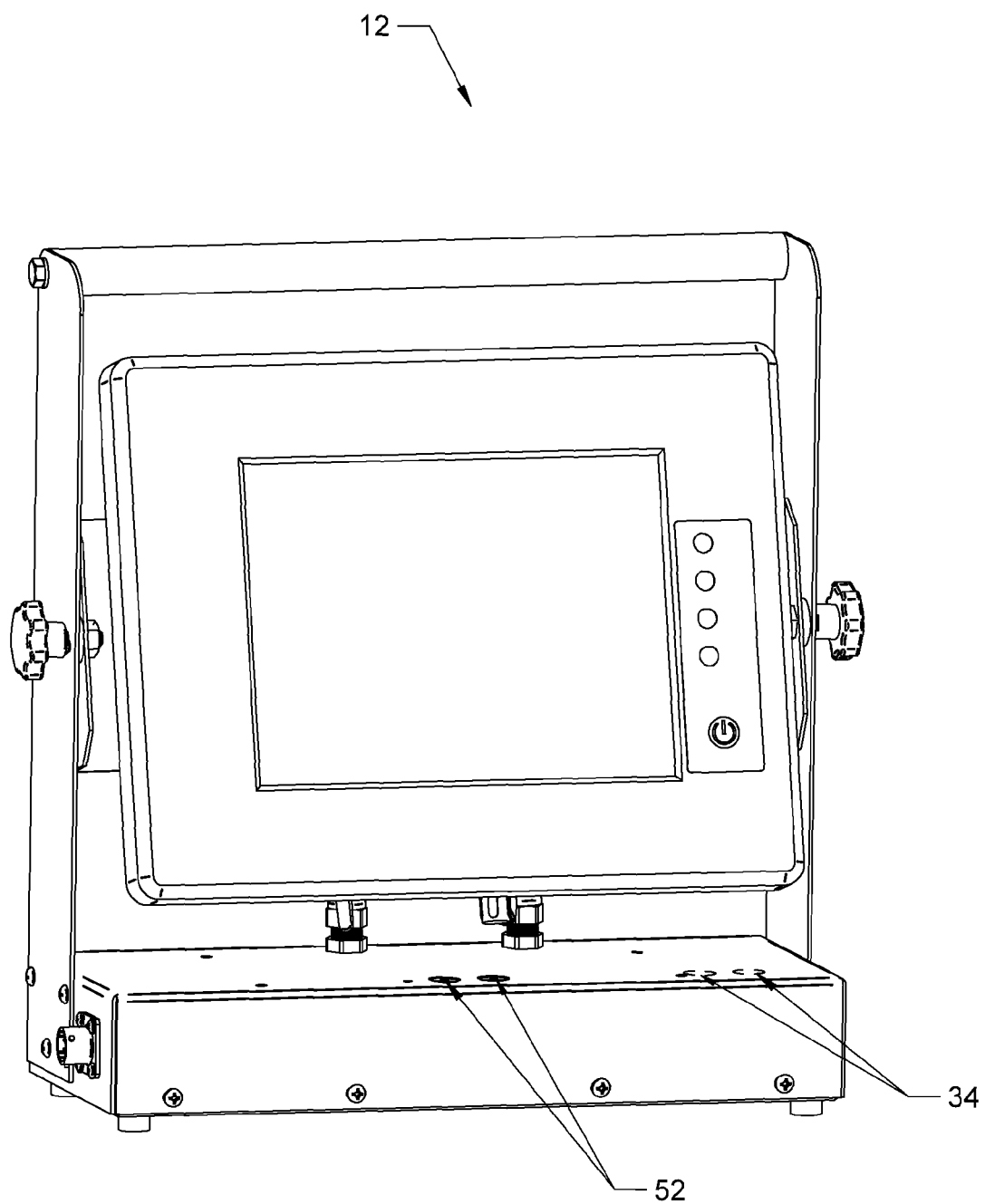
FIG. 13 is a perspective view of a monitor assembly used with the illustrative embodiment of FIG. 1.
Figure 14:
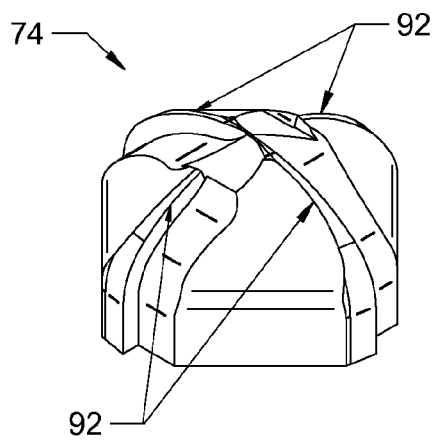
FIG. 14 is a perspective view of a cutting bit for use in the cutting head of the present invention.
Figure 15:
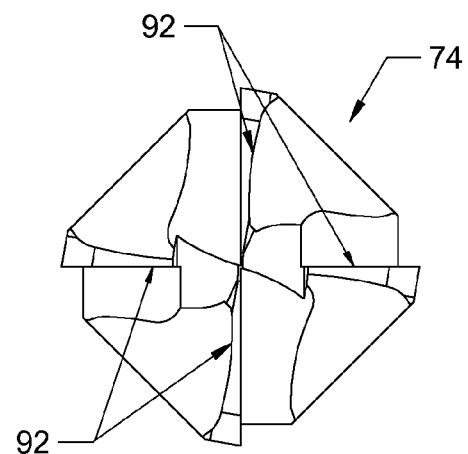
FIG. 15 is a top view of the cutting bit of FIG. 14.
Figure 16:
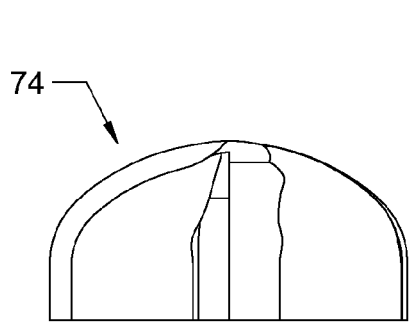
FIG. 16 is a side view of the cutting bit of FIG. 14.
Figure 17:
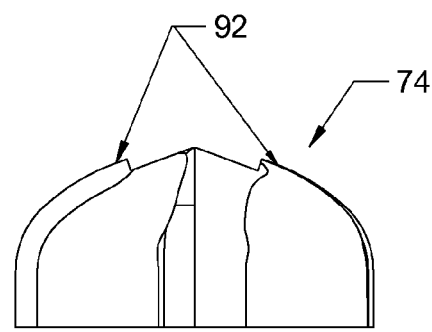
FIG. 17 is a front view of the cutting bit of FIG. 14.

A position of the cutter assembly in the pipe 56 is viewed using the monitor assembly 12. Referring to FIG. 13, in one embodiment, the monitor assembly 12 includes two buttons 52 to control the lighting brightness for the at least one camera 36. Other controls, such as, but not limited to, video recording or camera functions 34, may be added. In another embodiment, the two buttons 52 and/or the other controls are placed elsewhere on the remote cutting system 1, such as, but not limited to, the cart assembly 6, the control assembly 8, or a combination thereof. Referring again to FIGS. 1 and 3, mounting locations of the monitor assembly 12 include the ground, the cart assembly 8, the control assembly 8, or any other suitable location visible by the operator. The at least one camera 36 is mounted on the cutter assembly 4, in any other location for viewing the cutting head of the cutter assembly 4, or a combination thereof. In an alternate embodiment, the control assembly 8 and the monitor assembly 12 are wireless from the cart assembly 6. In another alternate embodiment, the monitor assembly 12 includes video glasses.

When the cutter assembly 4 is in position in the pipe 56, as viewed using the monitor assembly 12, the operator clamps the clamp 40 of the control assembly 8 tightly on the pushrod hose 10 to control the rotation and lateral movements of the pushrod hose 10 and the cutter assembly 4 in the pipe 56. Using the switches 30, 32, 48 on the control assembly 8, the operator controls the hydraulic power units 22 and the automated fluid valve 26 on the cart assembly 6.

For example, in one embodiment, the hydraulic power units 22 clamp and release the cutter assembly 4, and bend or tilt the cutting head 14, through actuation of the actuator 54. In another embodiment, the actuator 54 includes two double-acting hydraulic cylinders 24, and provides a pathway for the fluid coming through the pushrod hose 10 to the cutting head 14. In a further embodiment, the double-acting hydraulic cylinders 24 include a clamping cylinder 24A and a head-actuating cylinder 24B that are coupled to the hydraulic power units 22 by the four hydraulic hoses 18. The hydraulic power units 22 actuate the two double-acting hydraulic cylinders 24 to clamp the cutter assembly 4 in the pipe 56 and/or tilt the cutting head 14.

Referring again to FIGS. 10-12, in one embodiment, extending the clamping cylinder 24A clamps the cutter assembly 4 in the pipe 56. Extending the clamping cylinder 24A lowers a pair of skid rails 62 on the bottom of the actuator 54, as well as raises a clamping arm 64 on the top of the clamping cylinder 24A. As the clamping arm 64 sweeps past a window or lens of the at least one camera 36, a flexible member 66 cleans debris and water off of the window or lens. Alternatively the at least one camera 36 may be cleaned by means of air, water jet or other known devices or methods. With the clamping cylinder 24A extended, the rails 62 and arm 64 engage the walls of the pipe 56 to maintain the cutter assembly 4 in position relative to the pipe 56. An upper surface 65 of the actuator 54 may also contact the wall of the pipe 56 to provide additional support to the cutter assembly 4. In an alternate embodiment, the clamping mechanism could be accomplished by various means, such as air bags, pistons, or rotary actuators.

In another embodiment, extending the head-actuating cylinder 24B tilts the cutting head 14 towards the wall of the pipe 56. A linking arm 68 provides a pivoting point as the head 14 is tilted. In an alternate embodiment, the hydraulic cylinders 24 are actuated by any other suitable means, including, but not limited to, manual hydraulic actuators, such as hand or foot levers. In another alternate embodiment, the two hydraulic cylinders 24 in the actuator 54 are replaced with an electric-motor and/or pneumatic actuators. In yet another alternate embodiment, the head-actuating cylinder 24B is replaced with a hydraulic, pneumatic or electric rotary actuator. In still another alternate embodiment, a cable is used to flex the head against a rotary return spring.

After the cutter assembly 4 is in proper position, has been clamped in the pipe 56, and/or the cutting head 14 has been tilted towards the wall of the pipe 56, the automated fluid valve is opened to drive the cutting head 14. The cutting head 14 is comprised of two rotating members 70, 72 provided in the gearmotor cavity 69 that are turned by the fluid coming through the pushrod hose 10 from the fluid source 2. In one embodiment, the gearmotor cavity 69 is pressure balanced to handle the fluid coming through the pushrod hose 10. The rotating members 70, 72 are made of materials to minimize friction and withstand the forces of cutting. Bearings 94 (FIG. 12) allow the members 70, 72 to rotate freely. The free end of rotating member 70 is rounded to work as a thrust bearing member. Rotating member 72 is supported by a thrust bearing member 102. Locating or keying features 101 make a top half 88 and a bottom half 90 of a two-piece housing that forms the cutting head 14 fit securely together. The two halves 88, 90 are held together by screws (not shown) or other known means.

One of the rotating members 72 protrudes from the cutting head 14 and has a cutting bit 74 attached thereto. The bearings 94, the pressure balanced gearmotor cavity 69, and the materials of the two rotating members 70, 72, permit driving of the two rotating members 70, 72 with high-pressure water. When the fluid is the high-pressure water, the rotating member 72 is pressure balanced by porting any water that enters the cavity 69 to exit freely either under the cutting bit 74 or out a bottom port 103. Alternatively, when the two rotating members 70, 72 are driven by the oil, the oil is recirculated instead of being released into the pipe 56. In one embodiment, the cutting bit 74 is positioned on the cutting head 14 to cut into the side of a pipe liner positioned in the pipe 56. In an alternate embodiment, the cutter head 14 and/or the cutting bit 74 is positioned to allow the cutting action to take place in the axis of the pipe 56. The cutting action taking place in the axis of the pipe 56 is helpful for cleaning debris or cutting the "main line" liner from the lateral connection.

A cutting surface of the cutting bit 74 includes any suitable number of flutes 92, such as, but not limited to, between 2 and 8 flutes, between 2 and 6 flutes, between 2 and 4 flutes, between 4 and 6 flutes, or any combination, sub-combination, range, or sub-range thereof. For example, referring to FIGS. 14-17, in the embodiment shown, the cutting surface of the cutting bit 74 includes four non-helical, 0-degree rake, flutes 92. The four non-helical, 0-degree rake, flutes 92 provide a smooth, rounded cutting profile. In alternate embodiments, the cutting bit 74 includes a helix, a rake angle, or a combination thereof. Suitable rake angles include, but are not limited to, between −5 and +15 degrees, between 0 and +15 degrees, between −5 and +5 degrees, between −5 and 0 degrees, between 0 and +5 degrees, 0 degrees, or any combination, sub-combination, range, or sub-range thereof. The cutting bit 74 is made from materials specially suited for cutting abrasive materials, such as those used in lining pipes. A shape of the cutting bit 74 gives a chamfered finish to the cut so that a secondary step of cleaning the cutaway hole is unnecessary. The configuration of the cutting head 14 and the cutting bit 74 provide a low-profile, allowing the cutter device 4 to be used in confined areas.

In one embodiment, the cutting surface of the cutting bit 74 includes a gripping portion, such as, but not limited to, on a bottom half of the cutting bit 74. The gripping portion includes reliefs positioned between each of the flutes 92 extending there through. The reliefs are cut with straight sides, such that when a wrench is placed on the gripping portion, for example, during tightening and/or loosening of the cutting bit 74, the wrench jaws contact the reliefs and extend past the flutes 92, without contacting the flutes 92. By contacting the reliefs without contacting the flutes 92, the gripping portion reduces or eliminates dulling of the cutting bit 74 from the wrench during tightening and loosening.

For example, in one embodiment, the cutting bit 74 is tightened on the rotating member 72 by placing a common wrench on the non-cutting portions, and holding the shaft of the rotating member from rotating. The shaft is held from rotating by inserting a pin (not shown) through a slot 76 of the cutting head 14 until the pin engages a hole (not shown) on the shaft of the rotating member 72. The shaft and the cutting bit 74 have locating diameters to ensure proper alignment and balance of the cutting bit 74.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A cutter assembly comprising:
    a cutting head comprising:
        a fluid-driven gearmotor including a two-piece housing, bearings and a pressure balanced gearmotor cavity; and
    two rotating members provided in the pressure balanced gearmotor cavity, one of the rotating members protruding from the cutting head;
    wherein high-pressure fluid provided to the cutting head turns the two rotating members to drive a cutting bit attached to the rotating member protruding from the cutting head, wherein free ends of the two rotating members are rounded to work as a thrust bearing member; and
    wherein the pressure balanced gearmotor cavity is pressure balanced by porting any fluid that enters the gearmotor cavity to exit freely.

2. The cutter assembly of claim 1, wherein the high-pressure fluid is water.

3. The cutter assembly of claim 2, wherein the gear motor cavity is pressure balanced by porting the water that enters the gearmotor cavity to exit freely either under a cutting bit or out a bottom port of the cutter assembly.

4. The cutter assembly of claim 1, wherein an actuator is positioned proximate the cutting head, the fluid that enters the gearmotor cavity passes through the actuator.

5. The cutter assembly of claim 4, wherein the cutter assembly has hollowed pathways connected to a linking arm, wherein the fluid is moved from the actuator to the gearmotor cavity of the cutting head through the hollowed pathways and the linking arm.

6. The cutter assembly of claim 1, wherein at least one camera is provided on the cutter assembly.

7. The cutter assembly of claim 1, wherein the cutter assembly has linking arm, wherein the fluid is ported through the linking arm to transmit rotational torque to the cutting head, while allowing one axis of pivoting.

8. The cutter assembly of claim 1, wherein the high-pressure fluid is oil.

9. The cutter assembly of claim 1, wherein bearings are provided to allow the rotating members to rotate freely.

10. The cutter assembly of claim 1, wherein keying features extend between a first piece of the two-piece housing of the cutting head and a second piece of the two-piece housing of the cutting head.

11. The cutter assembly of claim 1, wherein the one of the rotating members protruding from the cutting head has a cutting bit attached thereto.

12. The cutter assembly of claim 11, wherein the cutting bit is positioned on the cutting head to cut into the side of a pipe liner positioned in a pipe.

13. The cutter assembly of claim 11, wherein the cutting bit is positioned on the cutting head to allow a cutting action to take place in a direction of an axis of a pipe.

* * * * *